United States Patent [19]

Kelsey

[11] Patent Number: 4,855,388

[45] Date of Patent: Aug. 8, 1989

[54] CO-REAGENT STABILIZATION OF POLY(ARYL ETHER SULFONES) USING SODIUM, LITHIUM, ALKALINE EARTH OR LANTHANIDE METAL SALTS

[75] Inventor: Donald R. Kelsey, Houston, Tex.

[73] Assignee: Amoco Corporation, Chicago, Ill.

[21] Appl. No.: 138,965

[22] Filed: Dec. 29, 1987

[51] Int. Cl.$^4$ .................... C08G 8/02; C08G 14/00
[52] U.S. Cl. .................... 528/125; 528/126; 528/128; 528/219
[58] Field of Search ............ 528/125, 126, 128, 219

[56] References Cited

U.S. PATENT DOCUMENTS 4,320,224  3/1982  Rose et al. .................... 528/125

*Primary Examiner*—John Kight
*Assistant Examiner*—M. L. Moore
*Attorney, Agent, or Firm*—Donald M. Papuga; William H. Magidson; Ralph C. Medhurst

[57] ABSTRACT

Described herein is a method for preventing molecular weight degradation in the preparation of poly(aryl ether sulfones) by nucleophilic displacement polycondensation reactions. This method comprises the addition of an effective amount of a sodium, lithium, alkaline earth or lanthanide metal salt to the polycondensation reaction to control the molecular weight of the poly(aryl ether sulfone).

10 Claims, No Drawings

CO-REAGENT STABILIZATION OF POLY(ARYL ETHER SULFONES) USING SODIUM, LITHIUM, ALKALINE EARTH OR LANTHANIDE METAL SALTS

FIELD OF THE INVENTION

This invention is directed to the stabilization of poly(aryl ether sulfones) using sodium, lithium, alkaline earth or lanthanide metal salts. The stabilization is of great practical importance, as it allows for the controlled and reproducible preparation of poly(aryl ether sulfones) via the nucleophilic polycondensation route.

BACKGROUND OF THE INVENTION

Poly(aryl ether sulfones) have been known for about two decades. They are tough linear polymers that possess a number of attractive features such as excellent high temperature resistance, good electrical properties, and very good hydrolytic stability. Two poly(aryl ether sulfones) are commercially available. A poly(aryl ether sulfone) is available from Imperial Chemical Industries, Ltd. It has the formula (1)

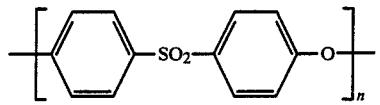
(1)

and is produced by the polycondensation of 4,4'-dihydroxydiphenyl sulfone with 4,4,'-dichlorodiphenyl sulfone as described in, for example, Canadian Pat. No. 847,963. The polymer contains no aliphatic moeities and has a heat deflection temperature of approximately 210° C. Another commercial poly(aryl ether sulfone) is available from Amoco Performance Products, Inc., under the trademark of UDEL®. It corresponds to formula (2),

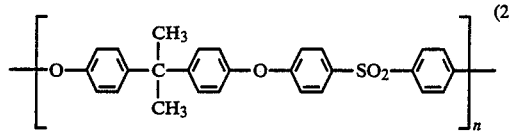
(2)

has a heat deflection temperature of about 180° C., and is made via the nucleophilic polycondensation of bisphenol-A di-sodium salt with 4,4'-dichlorodiphenyl sulfone, as described in U.S. Pat. No. 4,108,837.

Over the years, there has developed a substantial body of patent and other literature directed to the formation and properties of poly(aryl ethers) (hereinafter called "PAE"). A broad range of PAE's was achieved by Johnson et al., J. of Polymer Science, A-1, Vol. 5, 1967, pp. 2415-2427; Johnson et al., U.S. Pat. Nos. 4,108,837 and 4,175,175. Johnson et al. show that a very broad range of PAE's including a large number of poly(aryl ether sulfones) can be formed by the nucleophilic aromatic substitution (condensation) reaction of an activated aromatic dihalide and an aromatic diol. By this method, Johnson et al. created a host of new PAE's.

Poly(aryl ethers) including poly(aryl ether sulfones) are generally prepared by the nucleophilic substitution reaction of an activated aromatic dihalo- or dinitro-compound with a dialkali metal salt of a bisphenol; or by the self-condensation of the mono-alkali metal salt of a halo- or nitrophenol, wherein the halo or nitro group is in a position ortho- or para- to an electron-withdrawing group such as the sulfone group. This process is described in the aforementioned U.S. Pat. Nos. 4,108,837 and 4,175,175. The polymerizations are generally performed in aprotic solvents.

Other variants of the nucleophilic aromatic substitution reactions are described in the following references:

Canadian Pat. No. 847,963 describes a process for preparing polyarylene polyether sulfones. The process comprises contacting equimolar amounts of a dihydric phenol and a dihalobenzenoid compound and at least one mole of an alkali metal carbonate per mole of dihydric phenol. The dihydric phenol is in situ reacted with the alkali metal carbonate to form the alkali metal salt thereof and the formed salt reacts with the dihalobenzenoid compound to form the polyarylene polyether sulfone in the usual fashion.

U.S. Pat. No. 4,176,222 describes the preparation of aromatic polyethers containing $SO_2$ and/or CO linkages by a nucleophilic reaction utilizing a mixture of sodium carbonate or bicarbonate and a second alkali metal carbonate or bicarbonate. The alkali metal of the second alkali metal carbonate or bicarbonate has a higher atomic number than that of sodium. The second alkali metal carbonate or bicarbonate is used in amounts such that there are 0.001 to 0.2 gram atoms of the alkali metal of higher atomic number per gram atom of sodium. The process is stated to take place faster when the combination of sodium carbonate or bicarbonate and the second alkali metal carbonate or bicarbonate are used. Also, the products are stated to be of high molecular weight using such a combination.

U.S. Pat. No. 4,320,224 also describes the production of aromatic polyetherketones in the presence of an alkali metal carbonate or bicarbonate in an amount providing at least 2 gram atoms of alkali metal per mole of starting bisphenol. The patent states that the sole use of sodium carbonate and/or bicarbonate is excluded.

U.S. Pat. No. 3,941,748 describes the use of alkali metal fluoride for preparing polyarylethers. The process requires that sufficient fluoride be present so that the total fluoride available (including that from any fluoroaryl monomers) be at least twice the number of phenol (—OH) groups. The examples show it to be, in general, a slow process.

U.S. Pat. No. 4,169,178 refers to the British counterpart of U.S. Pat. No. 3,941,748, i.e., British Pat. No. 1,348,630. The patent states that the amount of alkali metal carbonate required may be reduced in the preparation of aromatic polyethers by employing fluorophenols or difluorobenzenoid compounds as part or all of the halogen-containing reactants. The patent states that the process gives faster reactions and higher molecular weights and less colored polymers than a process using potassium fluoride in place of potassium carbonate.

U.S. patent application Ser. No. 037,839, filed on Apr. 13, 1987 in the names of Paul A. Winslow, Donald R. Kelsey, and Markus Matzner, titled "Improved Process for Preparing Poly(aryl ethers) and Poly(aryl ether ketones)", commonly assiged, describes methods whereby high molecular weight, linear poly(aryl ethers) including poly(aryl ether sulfones) possessing excellent thermal stability and physical properties can be obtained at high polymerization rates. Specifically, the application is directed to an improved process for preparing poly(aryl ethers), poly(aryl ether sulfones, and poly(aryl ether ketones) by the reaction of a mixture of at least one bisphenol and at least one dihalobenzenoid compound, and/or a halophenol, in which the improvement comprises providing to the reaction medium, a combination of sodium or an alkaline earth metal carbonate and/or bicarbonate and a potassium, rubidium, or cesium salt of an organic acid or combinations of various organic salts thereof.

In another embodiment, the application is directed to an improved process for preparing poly(aryl ethers), poly(aryl ether sulfones), and poly(aryl ether ketones) by the reaction of a mixture of at least one bisphenol and at least one dihalobenzenoid compound, and/or a halophenol, in which the improvement comprises providing to the reaction medium a combination of sodium or an alkaline earth metal carbonate and/or bicarbonate and a lithium, sodium, or alkaline earth metal salt of an organic acid. In addition, this latter reaction can be catalyzed by the addition of a catalytic amount of a potassium, cesium, or rubidium salt catalyst. In this latter embodiment the process either does not make use at all of any added higher alkali metal compound (or compounds), contrary to the teaching in the prior art; or the process utilizes only catalytic amounts of higher alkali metal compounds which are substantially more effective than when used in prior art processes.

Moreover, all of the above variants may be advantageously performed in the presence of a small amount of cupric or cuprous ions.

In the preparations described hereinbefore, it is generally preferred to use either the chloro- or fluoro compounds as the activated halobenzenoid monomers. The chloro compounds are of interest because of their inexpensiveness. In some instances, however, the more expensive fluoro monomers have to be used. Such is the case when the electron withdrawing group is a relatively weak activating group (e.g., CO versus $SO_2$); and/or when the diphenols used are relatively acidic whose anions are weak nucleophiles (e.g., 4,4'-dihydroxydiphenyl sulfone).

Poly(aryl ether sulfones) prepared by nucleophilic displacement polycondensation may contain both phenate and halo aromatic end groups, e.g.,

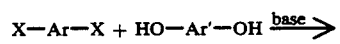

$$\text{Polymer—O—Ar'—O}^-\text{M}^+ \text{ and/or Polymer—Ar—X}$$

wherein X is a displaceable group such as halogen or nitro; M is the cation of the base used (e.g., Na$^+$, K$^+$, etc.) and Ar and Ar' are aromatic species. In the prior art, it has been customary to add a terminating agent, also referred to as an end-capping agent or end-stopper, at the end of the polymerization to react with the phenate end groups, e.g.,

For example, U.S. Pat. No. 4,108,837 illustrates in examples the use of methyl chloride as a terminating agent; U.S. Pat. No. 4,169,178 illustrates the use of dichlorodiphenylsulfone; and U.S. Pat. No. 4,320,224 illustrates the use of 4,4'-difluorobenzophenone as the terminating agent.

The use of an end-capping reagent can be useful for controlling the molecular weight of the polymer. However, more importantly, the presence of phenate or phenolic end groups in the polymer can lead to thermal instability. Converting these end groups to ether groups by use of an end-capping reagent results in generally improved thermal stability.

To assure that end-capping is complete, an excess of end-capping reagent is desirable, once the desired polymer molecular weight has been achieved; this, in order to assure that all of the residual phenate groups will react with the terminating reagent.

However, use of excess capping reagent can often lead to a significant decrease in molecular weight. This is known in the art; for example, U.S. Pat. No. 4,169,178 discloses that "end stopping may lead to some reduction in the polymer molecular weight". This patent illustrates in Examples 4, 6, and 7, for example, reductions in reduced viscosity of 0.11 to 0.29 within 5 to 10 minutes at 320° C.–330° C. after addition of a small amount of dichlorodiphenyl sulfone as the end-capping reagent.

This phenomenon has been confirmed in this application in Comparative Example A. The latter shows, that heating the poly(aryl ether sulfone) (1) in the presence of very small amounts of 1,4-bis(4-fluorobenzoyl)benzene and potassium fluoride in sulfolane, at 220° C., for 0.5 hours decreases the initial reduced viscosity of the polymer from 0.47 to 0.28 dl/g.

Attwood, et al. [Polymer, 18, 359 (1977)], have discussed the problem of terminating polysulfones prepared from fluorophenyl-sulphonyl phenoxides with methyl chloride. They postulated a depolymerization due to potassium fluoride, a depolymerization which they depicted as follows:

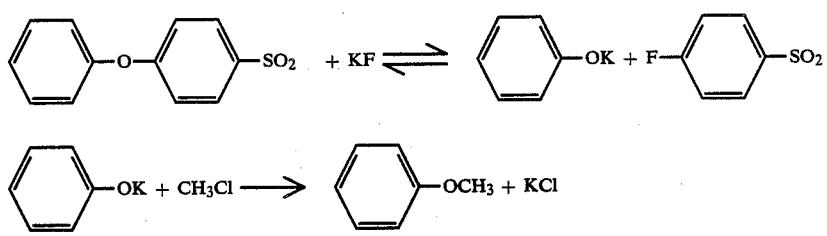

They suggested two methods to control the depolymerization during polymer termination:
(1) cool the reaction to "freeze" the equilibration by potassium fluoride before termination, or
(2) polymerize beyond the desired molecular weight, isolate the polymer, and then degrade the polymer in dimethyl sulfoxide with sodium methoxide to the desired molecular weight and terminate with methyl chloride.

Neither of the above methods is of practical interest. The first approach is generally not feasible because at temperatures at which termination proceeds effectively, equilibration often takes place as well, i.e., it is not totally supressed. On the other hand, the second approach given by Attwood et al. is cumbersome and, hence, expensive on a commercial scale.

Attwood et al. [British Polymer Journal, 4, 391 (1972)] also showed that polysulfones are cleaved at the ether linkage by fluoride ion; i.e., addition of potassium fluoride to a polysulfone resulted in re-equilibration to a lower molecular weight. With excess difluorodiphenyl sulfone also present, extensive depolymerization took place.

THE INVENTION

In the present invention, an effective method has been found to prevent molecular weight degradation in the preparation of poly(aryl ether sulfones) by nucleophilic displacement polycondensation reactions. This method comprises the addition of an effective amount of a sodium, lithium, alkaline earth, or lanthanide metal salt to the polycondensation reaction to control the molecular weight of the poly(aryl ether sulfone).

It is theorized that certain ions, particularly potassium fluoride, cleave the polymer, a reaction which is thought to be the reverse of the nucleophilic displacement polycondensation. The polymerization reaches an equilibrium as illustrated by the following:

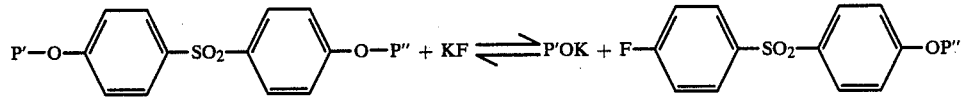

(where P' and P" indicate the polymer chain). In the presence of an end-capping agent, e.g., RX, the phenate end group can react with it, instead of reforming polymer:

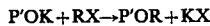

Thus, when RX is present in excess, the polymer will continue to equilibrate (via potassium fluoride) until all of the RX is consumed and the new equilibrium is reached at lower molecular weight. This is applicant's theory and applicant does not wish to be bound thereby.

The sodium, lithium, alkaline earth, or lanthanide metal salts suitable for use in this invention may be characterized by the following formula:

MX wherein M is sodium, lithium, an alkaline earth, or a lanthanide metal, and X is a non-oxidizing anion. It is well known in the art that certain anions such as nitrate and perchlorate can act as oxidizing agents under certain conditions and especially at elevated temperatures. However, such anions would cause side reactions which would be detrimental to the poly(aryl ether sulfones). For the purposes of this invention, non-oxidizing anions are those which do not react with the poly(aryl ether sulfone) or cause reactions deleterious to the polymer structure or properties when employed under the reaction conditions specified herein. Non-oxidizing anions include chloride, bromide, or iodide, sulfate, borate, carbonate, bicarbonate, phosphate, cyanide, or alkyl or aryl carboxylates, such as acetate, oxalate, and benzoate, and the like. The preferred salts include one or more of $LiCl$, $LiBr$, $Li_2SO_4$, $Li_2CO_3$, $NaBr$, $NaI$, $MgCl_2$, $MgSO_4$, $CaCl_2$, $CaSO_4$, $CaHPO_4$, $SrCl_2$, $BaCl_2$, $LaCl_3$, and the like.

The use of the sodium, lithium, alkaline earth, or lanthanide metal salt is applicable to nucleophilic displacement polymerizations of poly(aryl ether sulfones) in any form when potassium, rubidium, or cesium and fluoride ions are present in the reaction mixture. The sources of these ions are immaterial and may arise by the use of other salts (i.e., potassium carbonate), monomers which produce the ions by reaction (e.g., 4,4'-difluorodiphenyl sulfone), or addition of potassium, rubidium or cesium fluorides.

For the purposes of slowing or stopping advancement of molecular weight, addition of the sodium, lithium, alkaline earth, or lanthanide metal salt as a solid, slurry, or solution in an appropriate solvent is accomplished just prior to or at the desired molecular weight. The amount of sodium, lithium, alkaline earth, or lanthanide metal salt is from about 0.05 to about 10.0 equivalents or more based on the amount of potassium, rubidium or cesium present in aggregate, and preferably is from about 1.0 to about 2.0 equivalents.

If the molecular weight is too high, end-capping agent is added which allows cleavage of the polmer to occur and then the sodium, lithium, alkaline earth, or lanthanide metal salt is added when the desired molecular weight is attained to stop further degradation of the polymer.

For termination with an end-capping reagent, the sodium, lithium, alkaline earth, or lanthanide metal salt and reagent may be added together or the sodium, lithium, alkaline earth, or lanthanide metal salt can be added prior to or after the addition of the capping reagent. The amount of end-capping agent is preferably at least a stoichiometric equivalent or an excess based on the number of phenate end groups present. Generally, the effective amount of end-capping agent may be estimated, based on the total moles of bisphenol and/or halophenol used in the polycondensation reaction, to be from about 0.001 to about 0.5 moles or more, preferably from about 0.01 to about 0.25 moles, per mole of phenol groups charged.

An advantage of the instant invention is that excess end-capping agent may be used with little or no molecular weight degradation. However, the use of large excesses, especially of nonvolatile agents, may be recognized by one skilled in the art as undesirable since unreacted end-capping agent can complicate the isolation and purification of the polymer.

The end-capping agent is preferably an alkyl halide such as methyl chloride or a mono or difunctional aryl halide or nitro compound, such as 4-fluorobenzophenone, 4,4'-difluorobenzophenone, 4,4'-dichlorodiphenylsulfone, a monochlorodiphenylsulfone, 1,4-bis(p-fluorobenzoyl)benzene and the like, or a halogen terminated aromatic oligomer.

The poly(aryl ether) polymers suitable for the purposes of this invention are linear thermoplastic polyarylene polyethers containing recurring units of the formula:

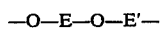

wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms with the proviso that one of E or E' contain SO$_2$. Such aromatic polyether sulfones are included within the class of polyarylene polyether resins described in, for example, U.S. Pat. Nos. 3,264,536 and 4,175,175. It is preferred that the dihydric phenol be weakly acidic dinuclear phenol such as, for example, the dihydroxyl diphenyl alkanes or the nuclear halo-genated derivatives thereof, such as, for example, the 2-2-bis(4-hydroxyphenyl)propane, 1,1-bis(4-hydroxyphenyl)-2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as for example, ether oxygen, (—O—), carbonyl

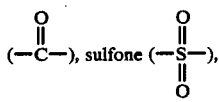

or hydrocarbon residue in which the two phenolic nuclei are joined to the same or different carbon atoms of the residue.

Such dinuclear phenols can be characterized as having the structure:

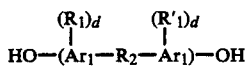

wherein Ar$_1$ is an aromatic group and preferable is a phenylene group; R$_1$ and R$'_1$ can be the same or different inert substituent groups such as alkyl groups having from 1 to 4 carbon atoms, aryl, halogen atoms, i.e., fluorine, chlorine, bromine or iodine, or alkoxy radicals having from 1 to 4 carbon atoms; the d's are independently integers having a value of from 0 to 4, inclusive; and R$_2$ is representative of a bond between aromatic carbon atoms as in dihydroxy-diphenyl, or is a divalent radical, including for example, radicals such as

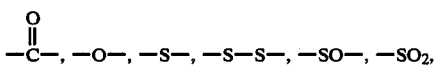

and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and radicals fused to both Ar$_1$ groups.

Examples of specific dihydric polynuclear phenols include, among others, the bis-(hydroxyphenyl) alkanes such as
2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)-methane
1,1-bis-(4-hydroxyphenyl)ethane
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxy-naphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane
2,2-bis-(4-hydroxyphenyl)1,1,1,3,3,3,-hexafluoropropane and the like;

di(hydroxyphenyl)sulfones and sulfoxides such as
bis-(4-hydroxyphenyl)sulfone,
2,4'-dihydroxydiphenyl sulfone,
5-chloro-2,4'-dihydroxydiphenyl sulfone,
5'-chloro-4,4'-dihydroxydiphenyl sulfone,
4,4'-dihydroxydiphenyl sulfoxide, and the like;

di(hydroxyphenyl)ethers and sulfides such as
bis-(4-hydroxyphenyl)ether,
the 4,3'-; 4,2'-; 2,2'-; 2,3'-dihydroxyphenyl ethers,
4,4'-dihydroxy-2,6-dimethyldiphenyl ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxydiphenyl sulfide, and
4,4'-dihydroxy-3,6-dimethoxydiphenyl ether.

dihydroxybiphenyls such as the 4,4'-; 2,4'-; 4,3'-biphenyls; mono-nuclear diphenols, such as hydroquinone and recorcinol; and the naphthalene diols, such as the 1,5-; 1,6-; 2,7-;, etc . . . naphthalene diols.

As herein used, the E term is defined as being the "residuum of the dihydric phenol" of course refers to the residue of the dihydric phenol after the removal of the two aromatic hydroxyl groups. Thus, as is readily seen, these polyarylene polyethers contain recurring groups of the residuum of the dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho or para to the halogen or nitro group. The dihalobenzenoid or dinitrobenzenoid compound can be either mononuclear, where the halogens or nitro groups are attached to the same benzenoid ring; or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1 percent and preferably below 0.5 percent for best results.

An electron withdrawing group is employed as the activator group in these compounds. It should be, of course, inert under the reaction conditions, but otherwise its structure is not critical. Preferred are the strongly activating groups such as the sulfone group

bonding two halogen or nitro-substituted benzenoid nuclei, as in 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating groups can be basically either of two types:
(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.
(b) divalent groups which can activate displacement of halogens on two different

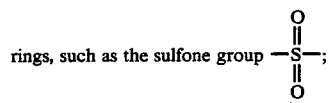

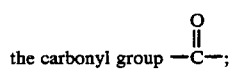

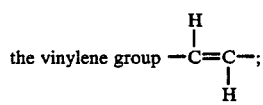

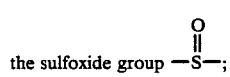

the azo group —N=N—;

—CF$_2$   —CF$_2$—CF$_2$—;

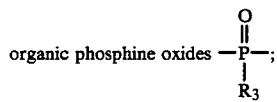

where R$_3$ is a hydrocarbon group and the ethylidene group

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyether sulfone polymers of this invention are prepared by methods well known in the art as for instance the one-step reaction of a double alkali metal salt of a dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt by the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with the dihalobenzenoid or dinitrobenzenoid compound.

Additionally, the polyether sulfones may be prepared by the procedure described in, for example, U.S. Pat. No. 4,176,222 in which at least one bisphenol and at least one dihalobenzenoid compound are heated at a temperature of from about 100° to about 400° C. with a mixture of sodium carbonate or bicarbonate and a second alkali metal carbonate or bicarbonate having a higher atomic number than that of sodium.

Further, the polyether sulfones may be prepared by the procedures described in Canadian Pat. No. 847,963 wherein the bisphenol and dihalobenzenoid compound are heated in the presence of potassium carbonate using a high boiling solvent such as diphenylsulfone.

Additionally, the polyether sulfones may be prepared by the procedures described in U.S. patent application Ser. No. 037,839, cited above; in which, for example, at least one bisphenol and at least one dihalobenzenoid compound, and/or a halophenol are heated at a temperature of from about 100° C. to about 400° C., in a dipolar aprotic solvent, with a mixture of sodium or an alkaline earth metal carbonate and/or bicarbonate and a potassium, rubidium, or cesium salt of an organic acid or combinations of various organic salts thereof.

Halophenols or nitrophenols wherein the halogen or nitro group is activated by an electron withdrawing group in the ortho- and/or para positions can also be used for the preparation of the poly(aryl ether sulfones). The halophenols or nitrophenols can be used alone or in conjunction with a diphenol and a dihalo- or dinitrobenzenoid compound as defined above.

Preferred polyarylene polyether sulfones of this invention are those prepared using the dihydric polynuclear phenols of the formulae (3)-(7) including the derivatives thereof which are substituted with inert substituent groups;

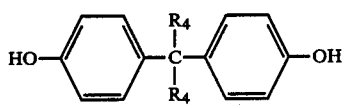
(3)

in which the R₄ groups represent independently hydrogen, lower alkyl, aryl and the halogen substituted groups thereof, which can be the same or different;

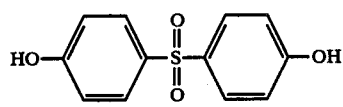
(4)

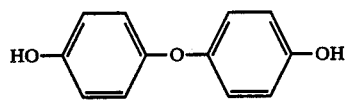
(5)

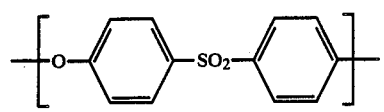
(6)

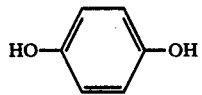

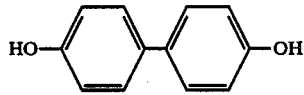
(7)

and substituted derivatives thereof.

It is also contemplated in this invention to use a mixture of two or more different dihydric phenols to accomplish the same ends as above. Thus, when referred to above, the —E— residuum in the polymer structure can actually be the same or different aromatic residua.

The preferred dichlorobenzenoid compounds are (8), (9), (10), (11); they may carry inert substituent groups.

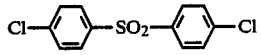
(8)

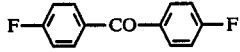
(9)

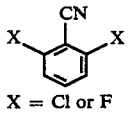
(10)

X = Cl or F

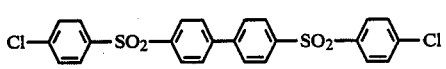
(11)

The most preferred poly(aryl ether sulfone) polymers have the repeating units (1), (2), (12), (13), and (14).

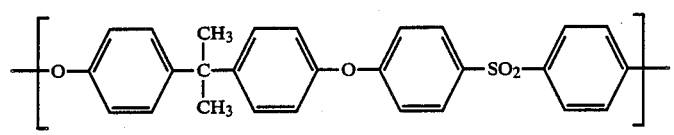
(1)

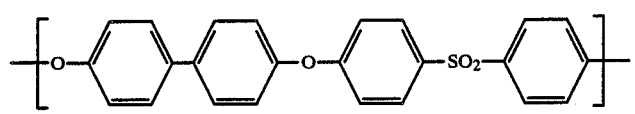
(2)

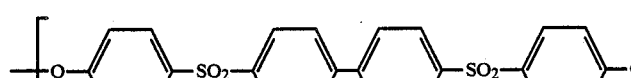
(12)

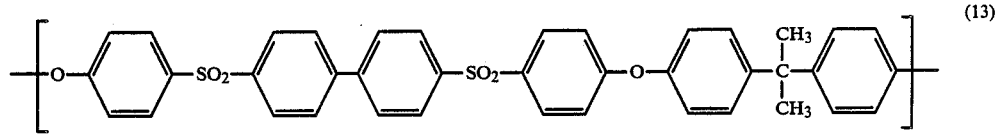
(13)

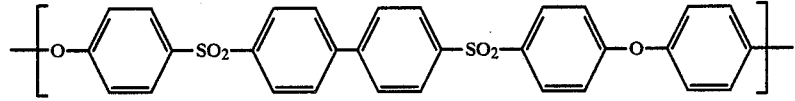
(14)

The poly(aryl ether sulfones) exhibit a reduced viscosity of from about 0.05 to about 5.0 and preferably, from about 0.3 to about 1.5 dl/g as measured in an appropriate solvent at 25° C. and at a concentration of 0.2 g/100 ml.

The poly(aryl ether sulfones) of this invention may include mineral fillers such as carbonates including chalk, calcite and dolomite; silicates including mica, talc, wollastonite; silicon dioxide; glass spheres, glass powders; aluminum, clay, quartz, and the like. Also, reinforcing fibers such as fiberglass, carbon fibers, and the like may be used. The polymers may also include additives such as titanium dioxide; thermal stabilizers, ultraviolet light stabilizers, plasticizers, and the like.

The poly(aryl ether sulfones) of this invention may be fabricated into any desired shape, i.e., moldings, coatings, films, or fibers.

EXAMPLES

The following examples serve to give specific illustrations of the practice of this invention but they are not intended in any way to limit the scope of this invention.

EXAMPLE 1

A 500 ml 4-neck flask fitted with a mechanical stainless steel stirrer, nitrogen inlet, thermometer, Claisen arm, condenser, bubbler, heating mantle, and Therm-o-watch temperature controller was charged with polyethersulfone (46.4 gm, initial reduced viscosity 0.48 dl/gm) as measured on 0.5 percent solutions in N-methyl pyrrolidone, at 25° C., having the formula (1)

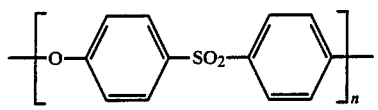

and 245 ml sulfolane and heated to 220° C. with stirring under nitrogen atmosphere to dissolve the polymer. After the polymer had dissolved, lithium chloride (1.696 gm, 0.04 moles, anhydrous), 1,4-bis(4-fluorobenzoyl)benzene (DFDK) (1.612 gm, 0.005 mole, recrystallized) and potassium fluoride (1.162 gm, 0.02 mole, anhydrous) was added in the sequence given followed by 5 ml sulfolane. After about 5 minutes, a 20 ml sample of the solution was removed using a pipette and coagulated into isopropanol in a Waring blender. The coagulated polymer was filtered, washed twice in the blender with water and then with isopropanol, and dried in the vacuum oven overnight at 100° C. Additional samples were removed over a total of 6 hours. These were coagulated and washed as described. The reduced viscosities of the polymer samples were measured on 0.5 percent solutions in N-methyl-pyrrolidinone at 25° C. and are given in Table I (in dl/gm).

COMPARATIVE EXAMPLE A

The reaction was conducted essentially as given in Example 1 except that the lithium chloride was omitted. Samples were removed, worked up, and the polymer reduced viscosities measured as in Example 1. Compared to Example 1 (Table I), severe degradation of the polymer molecular weight occurred within 30 minutes, and from this point on during the 6 hour hold at 220° C., the reduced viscosity was lower than that of the polymer in Example 1.

TABLE I

| RV At Time Minutes | KF/DFDK No MX | KF/DFDK With LiCl |
|---|---|---|
| 0: | 0.47 | 0.42 |
| 30: | 0.28 | — |
| 60: | 0.24 | 0.43 |
| 90: | 0.22 | — |
| 180: | 0.23 | 0.43 |
| 360: | 0.22 | 0.43 |

This data shows that a rapid molecular weight degradation of polyether sulfone occurs in the presence of KF and DFDK. This confirms the phenomenon reported by Attwood, et al. [British Polymer Journal, 4, 391 (1972)]. The data also show that when LiCl is added to the reaction, little or no molecular weight decrease occurred even after 6 hours at 220° C.

These results show that addition of MX stabilizes poly(aryl ether sulfones), in solutions containing fluoride and terminator. Hence, when these poly-mers are prepared under conditions in which KF (or RbF or CsF) is present or generated during the polymerization, molecular weight degradation during end-capping can be effectively suppressed.

What is claimed is:

1. An improved process for preparing poly(aryl ether sulfones) by a nucleophilic displacement reaction conducted in the presence of potassium, rubidium or cesium and fluoride, wherein the improvement comprises adding sodium, lithium, alkaline earth, or lanthanide metal salt to the polycondensation reaction just prior to or at the desired molecular weight in an amount effective to control the molecular weight of the poly(aryl ether sulfones).

2. An improved process for preparing poly(aryl ether sulfones) by a nucleophilic displacement reaction conducted in the presence of potassium, rubidium or cesium and fluoride, wherein the improvement comprises adding a metal salt which is characterized by the following formula:

MX wherein M is lithium, an alkaline earth, or a lanthanide metal, and X is a non-oxidizing anion selected from chloride, bromide, iodide, sulfate, carbonate, bicarbonate, alkyl or aryl carboxylate, cyanide, borate, or phosphate, to the polycondensation reaction just prior to or at the desired molecular weight in an amount sufficient to control the molecular weight of the poly(aryl ether sulphone).

3. A process as defined in claim 2 where in the lithium, alkaline earth, or lanthanide metal salt is selected from one or more of LiCl, LiBr, Li$_2$SO$_4$, Li$_2$CO$_3$, NaBr, NaI, MgCl$_2$, MgSO$_4$, CaCl$_2$, CaSO$_4$, CaHPO$_4$, SrCl$_2$, BaCl$_2$, or LaCl$_3$.

4. A process as defined in claim 3 wherein the lithium salt is LiCl.

5. A process as defined in claim 1 wherein an end-capping agent is added to the polycondensation reaction.

6. A process as defined in claim 5 wherein the end-capping agent is selected from an alkyl halide, a mono- or difunctional aryl halide, a nitro compound, or a halogen terminated aromatic oligomer.

7. A process as defined in claim 6 wherein the end-capping agent is selected from methyl chloride, 4-fluorobenzophenone, 4,4'-difluorobenzophenone, 4,4'-dichlorodiphenyl sulfone, a monochlorodiphenyl sulfone or 1,4-bis(p-fluorobenzoyl) benzene.

8. A process as defined in claim 5 wherein an end-capping agent is added together with the lithium, alkaline earth, or lanthanide metal salt.

9. A process as defined in claim 5 wherein the end-capping agent is added during the polycondensation reaction prior to the addition of the lithium, alkaline earth, or lanthanide metal salt.

10. An improved process for preparing poly(aryl ether sulfones) by a nucleophilic displacement reaction conducted in the presence of potassium, ribidium or cesium and fluoride, wherein the improvement comprises adding lithium, alkaline earth, or lanthanide metal salt to the polycondensation reaction in about 0.05 to about 10.0 equivalents based on the amount of potassium, rubidium or cesium present, just prior to or at the desired molecular weight to control the molecular weight of the poly(aryl ether sulfones).

* * * * *